United States Patent [19]
Kent et al.

[11] 3,842,642
[45] Oct. 22, 1974

[54] DRIVING MEANS FOR CONTAINERS OF EXTRUSION PRESS

[75] Inventors: Francis J. Kent, Wallingford; George Jaworski, Narberth, both of Pa.

[73] Assignee: Wean United, Inc., Pittsburgh, Pa.

[22] Filed: May 9, 1973

[21] Appl. No.: 358,748

[52] U.S. Cl................................ 72/263, 72/272
[51] Int. Cl............................................ B21c 23/00
[58] Field of Search.............................. 72/263, 272

[56] References Cited
UNITED STATES PATENTS
| | | | |
|---|---|---|---|
| 3,156,359 | 11/1964 | Elger | 72/263 |
| 3,345,854 | 10/1967 | Gross | 72/263 |

*Primary Examiner*—C. W. Lanham
*Assistant Examiner*—Robert M. Rogers
*Attorney, Agent, or Firm*—Henry C. Westin; Daniel Patch

[57] ABSTRACT

The disclosure of this invention pertains to a clutch arrangement employed to transmit the rotational movement of a driving means to the billet container assembly of an extrusion press in order to move the containers of the assembly from one press station to another press station. One clutch member is secured to the hub or spider of the container assembly in a manner that the member moves axially with the hub that rotatably supports the container assembly. A second clutch member is held against axial movement but is rotatable by a power means. During a certain axial position of the hub the axial movable clutch member engages with the other clutch member to transmit a rotational force to the hub; whereas, during other axial positions of the hub the clutch members are maintained out of engagement with each other.

5 Claims, 2 Drawing Figures

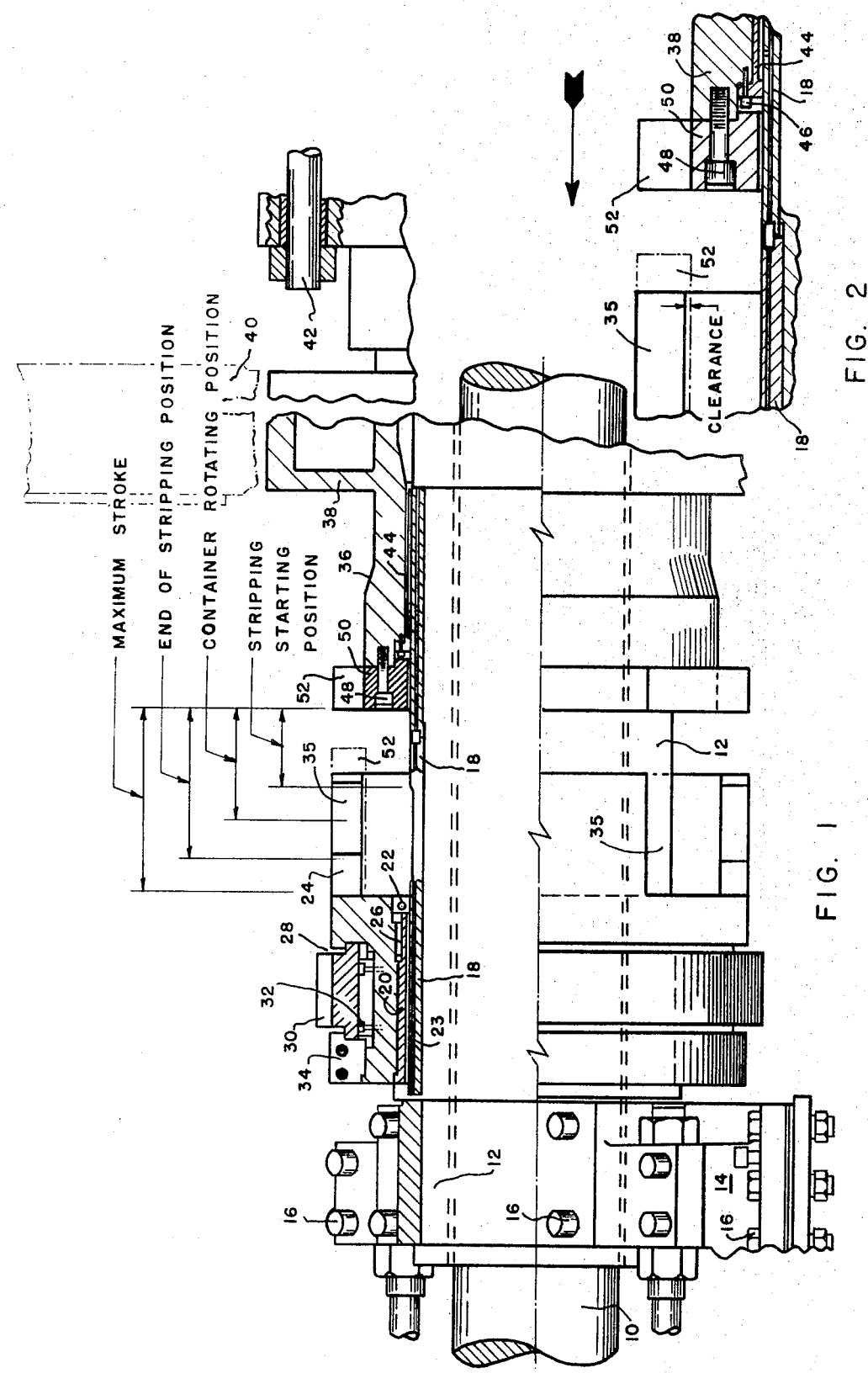

DRIVING MEANS FOR CONTAINERS OF EXTRUSION PRESS

Present day extrusion presses employing multiple containers have in many cases provided a clutch arrangement involving a separate sliding member and/or a separate power means, for example, a piston cylinder assembly to engage and disengage the driven and driving clutch members. The actual clutch employed for this purpose was more or less a standard operating type heavey duty clutch to which a special designed sliding member and/or power means was associated.

such a clutch arrangement not only was costly and required special designing of adjacent parts of the press, but, also required the employment of a separate sliding means and/or power means to engage and disengage the clutch members and a separate operating step.

It is the object of the present invention to provide a driving arrangement for the rotation of a container of an extrusion, forging or shaping press that will not require separate power means to engage or disengage the driving arrangement or involve a separate operational step to accomplish these operations, thereby reducing the operating cycle of the press and increasing its productivity.

It is a further object of the present invention to provide a clutch arrangement for the above purpose, including a first clutch member secured to a hub in a manner that it will move axially with the hub that rotatably supports one or more billet containers, a second clutch member held against axial movement but rotatable by a power means in which while in one axial position the clutch members automatically engage themselves to transmit the rotational force of said power means, and in another axial position the clutch members are maintained out of engagement.

It is a still further object of the present invention to so construct and arrange the clutch members that the axially movable clutch member is free to pass without interference beyond its operating position within the other clutch member.

It is still another object of the present invention to construct and arrange the hub rotating means and the clutch members for effecting this rotation relative to the various operative axial positions of the hub and its supported containers, which positions include the approach, sealing and stripping positions of the container in the extrusion station, such that the clutch members are brought into their driving relationship only when the hub is in the stripping positon, and while the hub is in the sealing, i.e. extrusion position the clutch members are disengaged and said power means can be repositioned, if necessary.

These objects, as well as other novel features and advantages of the present invention, will be better understood when the following description of one embodiment thereof is read along with the accompanying drawings of which:

FIG. 1 is an elevational view, partly in section, of the clutch hub driving arrangement of an extrusion press, and FIG. 2 is an enlarged view of a portion of FIG. 1, showing the clearance between the hub and the driving clutch member.

In referring first to FIG. 1 there is shown at 10 one of three of the tension columns of an horizontally arranged extrusion press cnstructed in accordance with well-known designs. The portion of the column shown in FIG. 1 falls between the cylinder crosshead which is arranged to the left and the stationary platen which is arranged on the right, each not being shown in the drawings. The column 10 is surrounded with an outer hollow shaft or shell 12 which is supported at two spaced points along its length by stands, one being shown at 14 in FIG. 1 which includes restraining bolts 16.

The shaft or shell 12 to the right of the stand 14 on its outer surface is machined to receive and support a stationary bearing sleeve 18 around which is arranged a flanged bushing 20, this member being held against axial movement by spaced end ring 22. The bearing sleeve 18 is provided with an axial extending lubricant passageway 23 for supplying lubricant between the rotating surfaces of the two bearing members 18 and 20. Outward of the bushing 20 is a driven clutch half 24 keyed for rotation with the bushing 20 by several keys 26. The clutch half 24 has an opening 28 for recieving a driving gear 30 secured to the clutch half by keys and bolts 32. For ease of assembly, the opening 28 is closed at one side by a removable ring 34 having complementary holding surfaces with the gear 30 as does the clutch half on the opposite side of the gear. The rotation of the gear and hence the clutch half 24 may be supplied by several well-known power means such as a rack and gear.

The actual driving portion of the clutch half 24 takes the form of several axially projecting teeth 35 constructed in an overhung fashion as one views the uppermost tooth shown in FIG. 1. The significance and importance of the opening formed radially inward of the teeth 35 and the length of the teeth will be explained later. The column 10 is shown to extend to the right of the drawing, whereas the hollow shaft 12 terminates as it does with respect to the stand 14 in a second supporting stand, not shown, arranged on the platen side of the hub of the billet container.

As shown in FIG. 1, the stationary bearing sleeve 18 extends to the right over the hollow shaft 12 until it is surrounded by a circular portion 36 of a hub or spider 38 to which, as noted before, there is secured one or more billet containers, one being partially shown in outline form at 40. It will be appreciated that while the container 40 is shown arranged close to the center portion of the hub, in actual construction the containers are arranged further radially away from the center portion of the hub so that on rotation by the hub about the shaft 12 the containers are selectively and sequentially positioned in the extrusion station of the press, as well as in one or more preparation stations, the stations also being radially displaced with respect to the hub.

In a customary manner the hub 38 is adapted to be moved axially relative to the shaft 12 to position the containers in their several operative positions which were noted before, such as the die approach, die sealing, withdrawal and butt stripping positions; these movements being accomplished through the agency of one or more linear power means such as piston cylinder assemblies, the adjacent end of one of which is shown at 42. In the vicinity of the sleeve portion 36 of the hub 38 a secnod rotatable L-shaped bearing member 44 is secured to the inner face of the portion 36 by bolts 46. A similar bearing construction will be provided for the other end of the hub 38 so that the hub and containers are free to rotate and be moved axially about the hollow shaft 12.

To the other end of the hub portion 36 there is attached by a series of bolts 48 a driven clutch half 50 having a number of teeth 52 arranged to fit into the openings between the teeth 35 of the driven clutch half 24. In comparing the relative portions shown in FIG. 2 with respect to the cooperative clutch halves, it will be observed that a clearance marked "clearance" in FIG. 2 is maintained between the radially inward surfaces of the teeth 35 of the half 24 and the roots of the teeth 52 of the half 50. In this way the teeth 52 are free to move unrestrictedly into the entire depth of the teeth 35.

The roots or depth of the driving clutch half 24 are made deep enough to accommodate the various positions of the hub or container to the extent that they involve movement towards the cylinder crosshead of the press. In FIG. 1, by legend, the stripping starting and ending positions are indicated, as well as the container rotating position, these positions being related to the front or inside face of the teeth 52 of the driven clutch half 50. An additional legend in FIG. 1 is shown with reference to the movement of the clutch half 50 towards the clutch half 24 and serves to indicate that additional axial movement is provided for in order to perform certain maintenance on the press.

It will be noted, in particular with respect to the container rotating position and with respect to the movement of the hub and container axially of the shaft 12 by the power means 42, that the clutch halves 24 and 52 are automatically brought into a driving engagement without the need of a separate operational step since it is accomplished during the axial movement of the hub and container during the stripping cycle of the press operation, the rotation of the hub during this period of time being supplied by the power means and gear 30. This power means can have a power stroke and a return stroke. If so, the return stroke can be accomplished through a particlar phase of the press cycle, for example, the sealing or extrusion phases where the clutch members are out of engagement which is the position indicated in the drawings. Whatever the form of the power means, the relative positions of the teeth of the clutch halves will be maintained in proper angular position so that their engagement will be assured on movement of the hub.

In accordance with the provisions of the patent statutes, we have explained the principles and operation of our invention and have illustrated and described what we consider to represent the best embodiment thereof.

We claim:

1. In combination with a press having one or more workpiece containers and means for moving said container in an axial direction towards and away from the die of said press incident to positioning the container in at least two selected positions relative to said die during various phases of the operation of said press, comprising:

means for supporting said container in a manner that the container is free to move in both an axial and arcuate manner towards and away from said die, said press having at least one tension column, and wherein said means for supporting said container includes a shaft member mounted concentric to said tension column, a driving clutch member, a driven clutch member, means for mounting said driving clutch member on said shaft member so as to allow said driving clutch member to rotate relative to said shaft member but held against axial movement, means for mounting said driven clutch member on said shaft member so as to allow said driven clutch member to both rotate and move axially relative thereto, means for securing said driven clutch member to said container, said driving and driven clutch members each including selectively engageable teeth for engaging each other in a driving relationship when said container is in at least one of said selected positions and for disengaging from each other in another of said selected positions, during which latter position and operating means can be operated on its return stroke, and means having a power stroke and a return stroke for operating said driving clutch member when said container is in said one selected position for imparting rotation to said container.

2. In combination with a press according to claim 1 wherein said means for supporting said container includes a hub, said means for securing said driven clutch member to said shaft member being arranged to allow said hub to rotate and move axially relative to said shaft member.

3. In combination with a press according to claim 2 wherein said teeth of said driving clutch member projects towards the teeth of said driven clutch member and have depths in said direction sufficient to allow the teeth of the driven clutch member to assume a number of different positions in said teeth of said driving clutch member, one position being a container rotating position which position is spaced from the base of the teeth of said driving clutch member thereby permitting further movement of said driven clutch member toward said base.

4. In combination with a press according to claim 3 in which the roots of the teeth of said driven clutch member and the corresponding surface of said hub are of a dimension relative to the corresponding surfaces of the teeth of the driving clutch member that the driven clutch member and hub are free to pass into the entire depth of the teeth of the driving clutch member.

5. A method of operating an extrusion press having one or more workpiece containers, a hub for supporting said container, means for moving said container in an axial direction towards and away from the die of said press incident to positioning the container in at least two selected positions relative to said die during various phases of the operation of said press and clutch members for moving said container in an arcuate manner relative to said die on operation of a power means, comprising the steps of:

axially and selectively positioning said container in an approach position, sealing position, and stripping position and bringing said clutch members into a driving relation only when said hub is in said stripping position and while a container is in said sealing position disengaging said clutch members so that said power means can be repositioned.

* * * * *